(12) United States Patent
Palnitkar et al.

(10) Patent No.: US 10,715,850 B2
(45) Date of Patent: Jul. 14, 2020

(54) RECOMMENDING RECENTLY OBTAINED CONTENT TO ONLINE SYSTEM USERS BASED ON CHARACTERISTICS OF OTHER USERS INTERACTING WITH THE RECENTLY OBTAINED CONTENT

(71) Applicant: Facebook, Inc., Menlo Park, CA (US)

(72) Inventors: Aditya Palnitkar, Mountain View, CA (US); Saurabh Gupta, Sunnyvale, CA (US); Yash Gupta, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 275 days.

(21) Appl. No.: 15/637,617

(22) Filed: Jun. 29, 2017

(65) Prior Publication Data
US 2019/0007720 A1    Jan. 3, 2019

(51) Int. Cl.
| | | |
|---|---|---|
| G06F 15/16 | (2006.01) | |
| H04N 21/25 | (2011.01) | |
| G06F 16/735 | (2019.01) | |
| G06F 16/9535 | (2019.01) | |
| H04N 21/442 | (2011.01) | |

(52) U.S. Cl.
CPC ......... *H04N 21/252* (2013.01); *G06F 16/735* (2019.01); *G06F 16/9535* (2019.01); *H04N 21/44204* (2013.01); *H04N 21/44222* (2013.01)

(58) Field of Classification Search
CPC .......... H04N 21/252; H04N 21/22204; H04N 21/44222; G06F 16/9535; G06F 16/735
USPC ................................. 709/203, 224; 707/734
See application file for complete search history.

(56) References Cited

U.S. PATENT DOCUMENTS

| | | | |
|---|---|---|---|
| 10,115,146 B1* | 10/2018 | Anderson | .............. G06Q 30/02 |
| 2014/0028572 A1* | 1/2014 | St. Clair | .............. G06F 3/0488 |
| | | | 345/173 |
| 2016/0188725 A1* | 6/2016 | Wang | .................. G06F 16/9535 |
| | | | 707/734 |
| 2017/0318339 A1* | 11/2017 | Fichter | ............. H04N 21/44204 |
| 2019/0058908 A1* | 2/2019 | Orlowski | ............... H04H 60/31 |

* cited by examiner

*Primary Examiner* — David R Lazaro
*Assistant Examiner* — Mariegeorges A Henry
(74) *Attorney, Agent, or Firm* — Fenwick & West LLP (57) ABSTRACT

An online system that recommends content to a user obtains a content item and receives limited interaction with the content item when it is obtained. The online system also maintains embeddings for various users based on interactions by the users with content presented to the users. Viewing users to whom the content item is presented and who performed one or more interactions with the content item are identified. Based on embeddings for the viewing users, the online system generates a content embedding for the content item. When the online system identifies a candidate user, the online system determines a similarity between the content embedding and an embedding of the viewing user and determines whether to recommend the content item to the candidate user based on the comparison.

16 Claims, 3 Drawing Sheets

RECOMMENDING RECENTLY OBTAINED CONTENT TO ONLINE SYSTEM USERS BASED ON CHARACTERISTICS OF OTHER USERS INTERACTING WITH THE RECENTLY OBTAINED CONTENT

BACKGROUND

This disclosure relates generally to recommending content to online system users, and more specifically to identifying content items having relatively little interaction by users to other users.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Many online systems recommend content to users based on interactions by other users with the content. For example, as users interact with a content item presented to them by the online system, the online system obtains information describing interactions by the users with the content item. Based on the interactions by users, the online system identifies other users likely to interact with the content item or who are likely to have an interest in the content item. This allows the online system to distribute the content item to users most likely to have an interest in the content item.

However, when an online system has received limited information describing interactions by users with a content item, the online system has difficulty identifying other users likely to have an interest in the content item. Certain types of content items obtained by the online system are more effective when presented to users in specific contexts, and if the online system has limited information about user interactions with the content item during one of the specific contexts, other users to whom the content item is likely to be relevant during the specific context are difficult to identify. For example, if a content item includes video for presentation live as the online system receives video, the online system has limited information describing user interaction with the live video, making it difficult for the online system to identify other users to whom the live video is likely to be relevant or interesting.

SUMMARY

An online system receives content items and presents the content items to various users. As the online system presents content items to various users, the online system captures information describing interactions (or actions) by users with the presented content items or after being presented with the content items. For example, the online system receives information identifying a user to whom a content item was presented, identifying the content item, and identifying actions by the user with the content item (e.g., indicating a preference or other reaction to the content item, sharing the content item with another user, commenting on the content item, identifying a complaint with the content item, etc.). The online system stores the identified actions in association with the user and with the content item, allowing the online system to log user interactions with content items.

Based on interactions by users with content items presented to the users, the online system generates and maintains an embedding corresponding to each user. The embedding corresponding to a user has multiple dimensions, with different dimensions corresponding to different information about the user. For example, dimensions of an embedding describe actions performed by the user, while other dimensions of the embedding describe characteristics of the user. However, in various embodiments, dimensions of an embedding describe any suitable information about a user corresponding to the embedding. Hence, an embedding corresponding to a user is a high dimensional vector in a latent space describing the user based on information associated with the user by the online system. Various methods may be used by the online system to generate an embedding corresponding to a user in different embodiments.

The online system obtains a content item that includes content for presentation to users of the online system. Any suitable content may be included in the content item for presentation. For example, the content item includes video data for presentation to users of the online system. The video data may be live video data to be presented to online system users as the online system receives the video data included in the content item. However, any suitable data may be included in the content item for presentation to users by the online system. The online system presents content included in the obtained content item to viewing users of the online system. For example, the online system presents content from the content item to viewing users who have a connection to a publishing user from whom the content item was obtained via the online system.

While presenting the content included in the content item to viewing users allows the online system to disseminate the content, dissemination of the content is limited to the viewing users. However, the online system may receive limited interactions with the content item from the viewing users, limiting the ability of the online system to identify other users to whom the content item is presented or other users who may have an interest in the content item. For example, if the content item includes video data for presentation to users as the online system receives the video data, the online system receives limited interactions with the content item from the viewing users presented with the video data. The limited amount of interaction with the content item limits information obtained by the online system for use in identifying other users to whom the content item is presented.

To increase a number of users to whom the content item is presented, the online system identifies a set of viewing users to whom the content item was presented who performed one or more specific actions with the content item. Hence, each viewing user of the set performed at least one of the specific actions with the content item when presented with the content item. The one or more specific actions used to identify the set of viewing users may differ depending on a type of content included in the content item. For example, if the content item includes video data, the set of viewing users includes viewing users who viewed at least a threshold amount of the video data when presented with the content item. As an example, if the content item includes video data presented to users as the online system receives the video data, the online system identifies the set as viewing users who viewed at least the threshold amount of the video data when the content item was presented to the viewing users. Other examples of specific actions used to identify the set of viewing users include indicating a preference for the content item, indicating a reaction to the content item, sharing the content item with another user, commenting on the content item, and indicating a complaint for the content included in the content item.

The online system retrieves maintained embeddings corresponding to each of the viewing users of the set and generates a content embedding associated with the content item based on the embeddings corresponding to the viewing users of the set. For example, the online system totals values of each different dimensions of embeddings corresponding to viewing users of the set and divides the total value of each dimension by a number of viewing users of the set, the content embedding is generated based on the corresponding average value of each dimension. As another example, the online system generates the content embedding by determining a centroid of the embeddings corresponding to viewing users of the set. In various embodiments, the online system determines weights associated with actions performed by different viewing users with the content item, and generates the content embedding by weighting embeddings corresponding to viewing users based on actions with the content item performed by different viewing users. The online system combines the weighted embeddings of the viewing users to generate the content embedding. For example, the online system associates a weight with embeddings corresponding to viewing users who indicated a preference for the content item, associates an alternative weight with embeddings corresponding to viewing users who provided a comment on the content item, and associated an additional weight with embeddings corresponding to viewing users who shared the content item with other users. The online system weights embeddings corresponding to different viewing users based on the actions performed by the viewing users with the content item and generates the content embedding based on the weighted embeddings corresponding to different viewing users. Hence, in some embodiments, the content embedding has multiple dimensions that each have a value corresponding to an average value of the dimension in embeddings corresponding to viewing users of the set.

In another example, viewing users of the set are clustered based on their corresponding embeddings, allowing different clusters of viewing users of the set to represent different combinations of interactions performed by viewing users of the set with content presented by the online system. Any suitable method may be used to cluster the viewing users; for example, the online system uses K-means clustering to cluster viewing users of the set based on the embeddings corresponding to each of the viewing users of the set. From the embeddings for various viewing users in a cluster, the online system may generate a characteristic embedding for various clusters (e.g., for each cluster). For example, a characteristic embedding is generated for each cluster based on the embedding corresponding to each viewing user in a cluster. The online system generates the content embedding by aggregating characteristic embeddings for multiple clusters, such as by aggregating characteristic embeddings for each cluster or by averaging characteristic embeddings for each cluster.

The online system identifies a candidate user and retrieves an embedding corresponding to the candidate user. For example, the online system receives a request for content from a user and identifies the user as the candidate user. Subsequently, the online system retrieves the embedding corresponding to the candidate user from a user profile maintained by the online system for the candidate user. The online system determines a similarity of the embedding corresponding to the candidate user and the content embedding. In various embodiments, the online system users any suitable method to determine the similarity of the embedding corresponding to the candidate user and the content embedding. For example, the online system determines a cosine similarity between the embedding corresponding to the candidate user and the content embedding. Alternatively, the online system determines a distance (e.g., a Euclidean distance) between the embedding corresponding to the candidate user and the content embedding as the similarity of the embedding corresponding to the candidate user and the content embedding. In other embodiments, the online system determines a dot product between the embedding corresponding to the candidate user and the content embedding as the similarity of the embedding corresponding to the candidate user and the content embedding. However, in other embodiments, the online system determines the similarity of the embedding corresponding to the candidate user and the content embedding using any suitable method or methods.

If the similarity of the embedding corresponding to the candidate user and the content embedding satisfies one or more criteria, the online system communicates a recommendation for the content item to a client device associated with the candidate user. For example, if the similarity of the embedding corresponding to the candidate user and the content embedding is a cosine similarity, the online system communicates the recommendation for the content item in response to the similarity equaling or exceeding the threshold. As another example, if the similarity of the embedding corresponding to the candidate user and the content embedding is a distance, the recommendation for the content item is communicated in response to the distance being less than a threshold distance. If the similarity of the embedding corresponding to the candidate user and the content embedding does not satisfy the one or more criteria, the online system does not communicate the recommendation for the content item to the client device associated with the candidate user.

Alternatively, the online system determines similarities between the embedding corresponding to the candidate user and embeddings corresponding to viewing users of the set. Based on the determined similarities, the online system determines an amount of viewing users of the set having embeddings with at least a threshold similarity to the embedding corresponding to the candidate user and generates a score of the content item for the candidate user from the determined amount. For example, the online system generates the score of the content item for the candidate user as a number of viewing users of the set having embeddings with at least the threshold similarity to the embedding corresponding to the candidate user. Alternatively, the online system generates the score of the content item for the candidate user based on a percentage of viewing users of the set having embeddings with at least the threshold similarity to the embedding corresponding to the candidate user. In other embodiments, the online system determines the score of the content item for the candidate user as an average (or median) similarity between embeddings corresponding to viewing users of the set and the embedding corresponding to the candidate user. If the score of the content item equals or exceeds a threshold score, the online system communicates the recommendation of the content item to the candidate user as described above.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
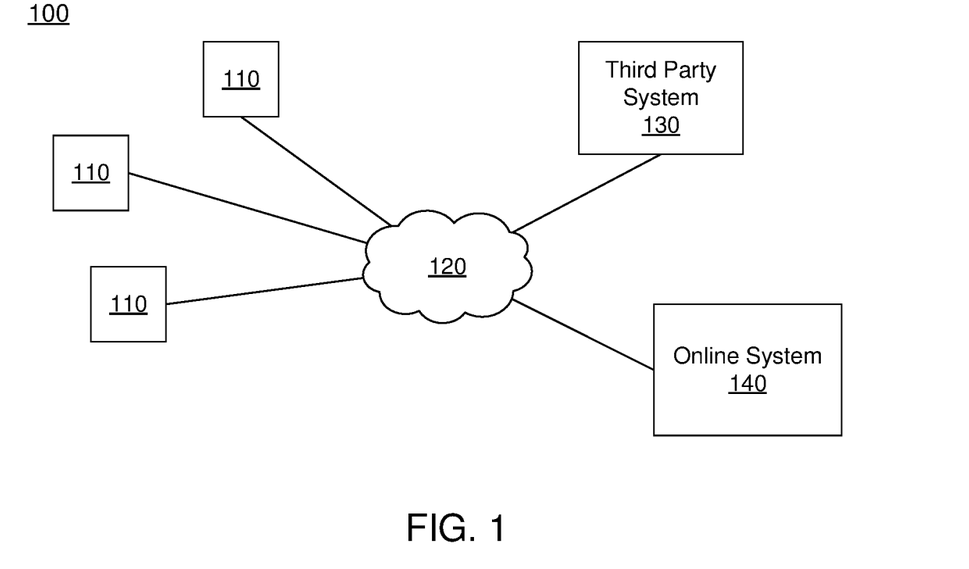
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
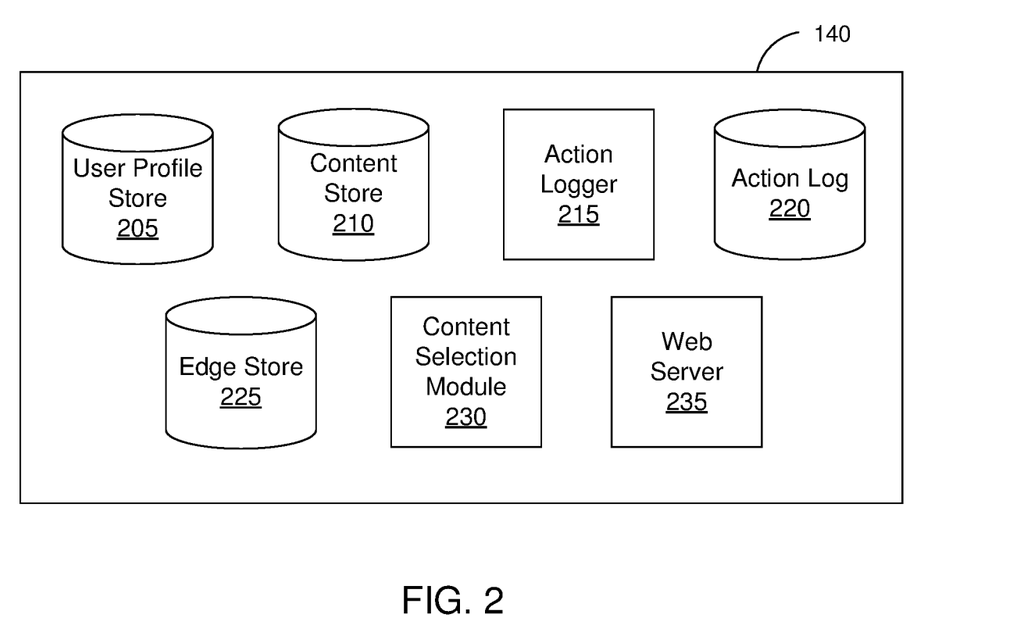
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140.

Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

The action logger 215 may also generate embeddings for various users based on actions performed by the users with content presented via the online system 140. For example, the action logger 215 retrieves interactions with content by a user from the action log 220 and generates an embedding for the user based on a number of different retrieved from the action log 220. As further described below in conjunction with FIG. 3, the embedding for the user includes multiple dimensions that each correspond to information about the user. For example, values of dimensions for an embedding for a user may be based on actions performed by the user, connections between the user and other users or objects from the edge store 225, characteristics of the user from the user profile store 205, or any other suitable information. However, dimensions of an embedding for a user may be based on any suitable characteristics of or information about the user in various embodiments. Hence, an embedding corresponding to a user is a high dimensional vector in a latent space describing the user based on information associated with the user by the online system. Various methods may be used by the action logger 215 to generate an embedding corresponding to a user in different embodiments. The embedding for a user is stored in association with the user. For example, the embedding for a user is stored in a user profile for the user in the user profile store 205.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed includes content items such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed including a plurality of content items selected for presentation to the user. The content selection module 230 may also determine the order in which selected content items are presented via the feed. For example, the content selection module 230 orders content items in the feed based on likelihoods of the user interacting with various content items.

The content selection module 230 may also account for characteristics of and interactions by users when recommending a content item to other users. When the online system 140 obtains a content item, the content selection module 230 has limited information describing user interaction with the content item, making it difficult for the content selection module 230 to identify users who are likely to be interested in the content item. To more rapidly identify users likely to have an interest in the content item, the content selection module 230 retrieves embeddings maintained for viewing users who have been presented with the content item and who performed one or more specific actions with the content item. For example, if the content item includes video data, the content selection module 230 retrieves embeddings maintained for viewing users who viewed at least a threshold amount of the video data. As further described below in conjunction with FIGS. 3 and 4, the content selection module 230 generates a content embedding for the content item based on the retrieved embeddings. Subsequently, the content selection module 230 compares embeddings maintained for candidate users to the content embedding to determine whether to recommend the content item to candidate users. As further described below in conjunction with FIG. 3, the content selection module 230 determines a similarity between an embedding maintained for a candidate user and the content embedding and provides a recommendation for the content item to the candidate user if the similarity equals or exceeds a threshold.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Determining Online System Users to Whom to Recommend Recently Obtained Content

Figure 3:
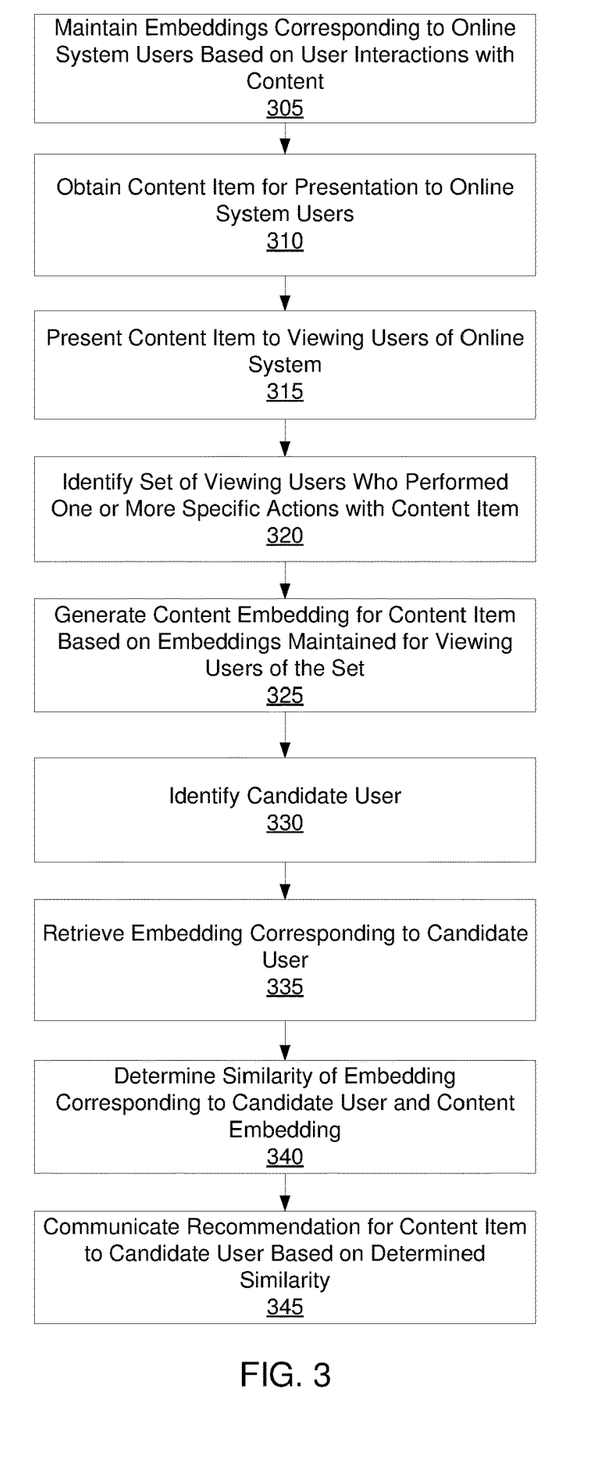
FIG. 3 is a flowchart of a method for an online system to determine whether to recommend an obtained content item to a candidate user of the online system, in accordance with an embodiment.

FIG. 3 is a flowchart of one embodiment of a method for an online system 140 to determine whether to recommend an obtained content item to a candidate user of the online system 140. In various embodiments, the steps described in conjunction with FIG. 3 may be performed in different orders. Additionally, in some embodiments, the method may include different and/or additional steps than those shown in FIG. 3.

As the online system 140 presents content items to various users, the online system 140 captures information describing interactions (or actions) by the users with the presented content items or after being presented with the content items. When the online system 140 presents a content item to users, the online system 140 receives information describing actions by various users with the presented content item. For example, the online system 140 receives information identifying a user to whom a content item was presented, identifying the content item, and identifying actions by the user with the content item (e.g., indicating a preference or other reaction to the content item, sharing the content item with another user, commenting on the content item, identifying a complaint with the content item, etc.). The online system 140 stores the identified actions in association with the user and with the content item, allowing the online system 140 to log user interactions with content items, as further described above in conjunction with FIG. 2.

Based on interactions by users with content items presented to the users, the online system 140 generates an embedding corresponding to each user and maintains 305 an embedding corresponding to each user of the online system 140. The embedding corresponding to a user has multiple dimensions, with different dimensions corresponding to information about the user. For example dimensions of an embedding describe actions performed by the user, while other dimensions of the embedding describe characteristics of the user. However, in various embodiments, dimensions of an embedding represent any suitable information about a user corresponding to the embedding. Hence, an embedding corresponding to a user is a high dimensional vector in a latent space describing the user based on information associated with the user by the online system 140. Various methods may be used by the online system to generate an embedding corresponding to a user in different embodiments, with the online system 140 maintaining 305 the embeddings in association with their corresponding users. For example, the online system 140 includes an embedding corresponding to a user in a user profile maintained by the online system 140 for the user.

The online system 140 obtains 310 a content item that includes content for presentation to users of the online system 140. Any suitable content may be included in the content item for presentation. For example, the content item includes video data for presentation to users of the online system. The video data may be live video data to be presented to online system users as the online system 140 receives the video data included in the content item. However, any suitable data may be included in the content item for presentation to users by the online system 140.

After obtaining 310 the content item, the online system 140 presents 315 content included in the content item to viewing users of the online system 140. For example, the online system 140 presents 315 content from the content item to viewing users who have a connection to a publishing user from whom the content item was obtained 310 via the online system 140. As another example, the online system 140 presents 315 content included in the content item to viewing users who performed one or more particular interactions with a specific object maintained by the online system 140 (e.g., a page associated with a publishing user from whom the content item was obtained 305, an event associated with the publishing user from whom the content item was obtained 305, etc.).

While presenting 315 the content included in the content item to viewing users allows the online system 140 to disseminate the content, dissemination of the content is limited to the viewing users. However, the online system 140 may receive limited interactions with the content item from the viewing users, limiting the ability of the online system 140 to identify other users to whom the content item is presented or other users who may have an interest in the content item. For example, if the content item includes video data for presentation to users as the online system 140 receives the video data, the online system 140 receives limited interactions with the content item from the viewing users presented 310 with the video data. The limited amount of interaction with the content item limits information obtained by the online system 140 for use in identifying other users to whom the content item is presented.

To present 315 the content item to a larger number of users, the online system 140 identifies 320 a set of viewing users to whom the content item was presented who performed one or more specific actions with the content item. Hence, each viewing user of the set performed at least one of the specific actions with the content item when presented 315 with the content item. The one or more specific actions used to identify 320 the set of viewing users may differ depending on a type of content included in the content item. For example, if the content item includes video data, the set of viewing users includes viewing users who viewed at least a threshold amount of the video data when presented 315 with the content item. As an example, if the content item includes video data presented to users as the online system 140 receives the video data, the online system 140 identifies 320 the set as viewing users who viewed at least the threshold amount of the video data when the content item was presented to the viewing users. Other examples of specific actions used to identify 320 the set of viewing users include indicating a preference for the content item, indicating a reaction to the content item, sharing the content item with another user, commenting on the content item, and indicating a complaint for the content included in the content item.

In some embodiments, the online system 140 also accounts for characteristics of viewing users when identifying 320 the set of viewing users. For example, the online system 140 identifies 320 viewing users who performed the one or more specific interactions and also who have one or more particular characteristics. As an example, the set of viewing users includes users who are associated with a particular location and who viewed at least the threshold amount of video data included in the content item or who indicated a reaction to the content item. In some embodiments, the content item includes targeting criteria, so the set of viewing users includes users having characteristics satisfying at least a threshold amount of the targeting criteria. As an additional example, the online system 140 identifies 320 the set of viewing users as users who are currently viewing video data in the content item and who have viewed at least the threshold amount of video data included in the content item.

The online system 140 retrieves maintained embeddings corresponding to each of the viewing users of the set and generates 325 a content embedding associated with the content item based on the embeddings corresponding to the viewing users of the set. For example, the online system 140 totals values of each different dimensions of embeddings corresponding to viewing users of the set and divides the total value of each dimension by a number of viewing users of the set, the content embedding is generated 325 based on the corresponding average value of each dimension. As another example, the online system 140 generates 325 the content embedding by determining a centroid of the embeddings corresponding to viewing users of the set. In various embodiments, the online system 140 determines weights actions performed by different viewing users with the content item, and generates 325 the content embedding by weighting embeddings corresponding to viewing users based on actions with the content item performed by different viewing users. The online system 140 combines the weighted embeddings of the viewing users to generate 325 the content embedding. For example, the online system 140 associates a weight with embeddings corresponding to viewing users who indicated a preference for the content item, associates an alternative weight with embeddings corresponding to viewing users who provided a comment on the content item, and associated an additional weight with embeddings corresponding to viewing users who shared the content item with other users. The online system 140 weights embeddings corresponding to different viewing users based on the actions performed by the viewing users with the content item and generates 325 the content embedding based on the weighted embeddings corresponding to different viewing users. For example, the online system 140 generates 325 the contend embedding as a ratio of a sum of embeddings corresponding to viewing users weighted by actions with the content item performed by viewing users corresponding to the embeddings to a sum of the weights associated with different actions with the content item. Hence, in some embodiments, the content embedding has multiple dimensions that each have a value corresponding to an average value of the dimension in embeddings corresponding to viewing users of the set.

In another example, viewing users of the set are clustered based on their corresponding embeddings, allowing different clusters of viewing users of the set to represent different combinations of interactions performed by viewing users of the set with content presented 315 by the online system 140. Any suitable method may be used to cluster the viewing users; for example, the online system 140 uses K-means clustering to cluster viewing users of the set based on the embeddings corresponding to each of the viewing users of the set. Using K-means clustering causes a content item to be clustered based on the distance of each dimension of an embedding corresponding the viewing user to a mean value associated with a dimension across all embeddings. For example, viewing users having a value associated with a dimension that is within a specified distance to a mean value associated with the dimension are included in a cluster. From the embeddings for various viewing users in a cluster, the online system 140 may generate a characteristic embedding for various clusters (e.g., for each cluster). For example, a characteristic embedding is generated for each cluster based on the embedding corresponding to each viewing user in a cluster. A characteristic embedding represents a combination of interactions performed by viewing users included in a cluster. The online system 140 generates 325 the content embedding by aggregating characteristic embeddings for multiple clusters, such as by aggregating characteristic embeddings for each cluster or by averaging characteristic embeddings for each cluster.

The online system 140 identifies 330 a candidate user and retrieves 335 an embedding corresponding to the candidate user. For example, the online system 140 receives a request for content from a user and identifies 330 the user as the candidate user. Subsequently, the online system 140 retrieves 335 the embedding corresponding to the candidate user from a user profile maintained by the online system 140 for the candidate user. As another example, the online system 140 identifies 330 the candidate user as a user who has not been presented 315 with the content item and who has characteristics satisfying at least a threshold amount of targeting criteria included in the content item.

The online system 140 determines 340 a similarity of the embedding corresponding to the candidate user and the content embedding. In various embodiments, the online system 140 users any suitable method to determine 340 the similarity of the embedding corresponding to the candidate user and the content embedding. For example, the online system 140 determines 340 a cosine similarity between the embedding corresponding to the candidate user and the content embedding. Alternatively, the online system 140 determines 340 a distance (e.g., a Euclidean distance) between the embedding corresponding to the candidate user and the content embedding as the similarity of the embedding corresponding to the candidate user and the content embedding. As another example, the online system 140 determines a dot product of the embedding corresponding to the candidate user and the content embedding to determine 340 the similarity of the embedding corresponding to the candidate user and the content embedding. However, in other embodiments, the online system 140 determines 340 the similarity of the embedding corresponding to the candidate user and the content embedding using any suitable method or methods.

If the similarity of the embedding corresponding to the candidate user and the content embedding satisfies one or more criteria, the online system 140 communicates 345 a recommendation for the content item to a client device 110 associated with the candidate user. For example, if the similarity of the embedding corresponding to the candidate user and the content embedding is a cosine similarity, the online system 140 communicates 345 the recommendation for the content item in response to the similarity equaling or exceeding the threshold. As another example, if the similarity of the embedding corresponding to the candidate user and the content embedding is a distance, the recommendation for the content item is communicated 345 in response to the distance being less than a threshold distance. In other embodiments, the similarity of the embedding corresponding to the candidate user and the content embedding is compared to any suitable threshold when determining whether the recommendation is communicated 345 to the client device 110 associated with the candidate user. If the similarity of the embedding corresponding to the candidate user and the content embedding does not satisfy the one or more criteria, the online system 140 does not communicate the recommendation for the content item to the client device 110 associated with the candidate user. The recommendation for the content item includes a link to retrieve the content item from the online system 140 and may also include information describing the content item (e.g., a title, a name, a description, an identifier of a publishing user from whom the content item was obtained 310, etc.).

Alternatively, the online system 140 determines similarities between the embedding corresponding to the candidate user and embeddings corresponding to viewing users of the set. Based on the determined similarities, the online system 140 determines an amount of viewing users of the set having embeddings with at least a threshold similarity to the embedding corresponding to the candidate user and generates a score of the content item for the candidate user from the determined amount. For example, the online system 140 generates the score of the content item for the candidate user as a number of viewing users of the set having embeddings with at least the threshold similarity to the embedding corresponding to the candidate user. Alternatively, the online system 140 generates the score of the content item for the candidate user based on a percentage of viewing users of the set having embeddings with at least the threshold similarity to the embedding corresponding to the candidate user. In other embodiments, the online system 140 determines the score of the content item for the candidate user as an average (or median) similarity between embeddings corresponding to viewing users of the set and the embedding corresponding to the candidate user. If the score of the content item equals or exceeds a threshold score, the online system 140 communicates 345 the recommendation of the content item to the candidate user as described above.

In some embodiments, the online system 140 determines whether to store the content embedding in association with the content item based on viewing users and other users who interacted with the content item. For example, the online system 140 determines a number of viewing users and other users who interacted with the content item and stores the content embedding in association with the content item if at least a threshold number of viewing users and other users (e.g., candidate users to whom the content item was presented) interacted with the content item. For example, if less than the threshold number of viewing users and other users viewed at least the threshold amount of video data included in the content item, the online system 140 does not store the content embedding in association with the content item. As another example, if less than a threshold number of users viewed video data included in the content item after the video data was received by the online system, the online system 140 does not store the content embedding in association with the content item.

Figure 4:
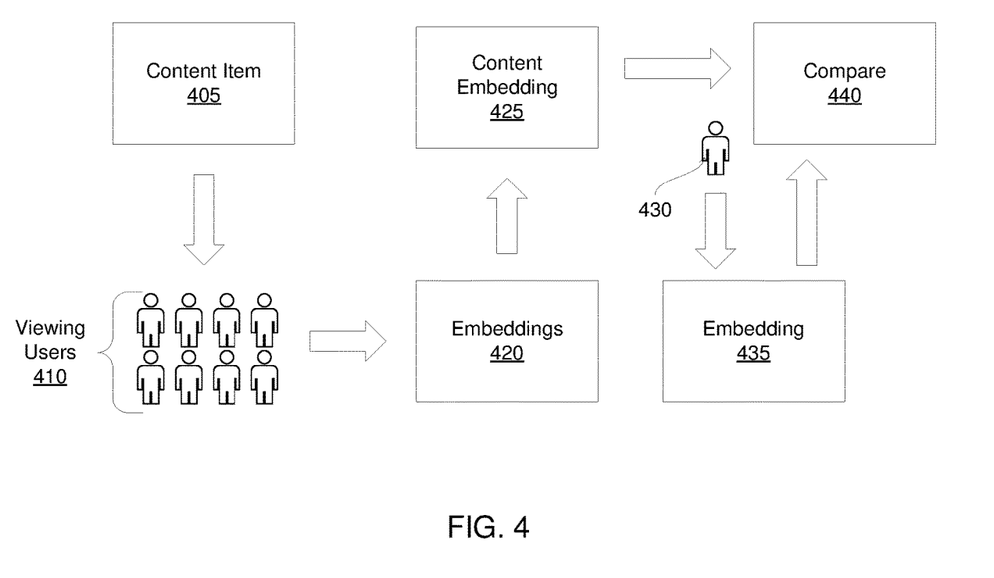
FIG. 4 is a process flow diagram of an online system determining whether to recommend a content item to one or more candidate users, in accordance with an embodiment.

FIG. 4 is a process flow diagram of an online system 140 determining whether to recommend a content item 405 to one or more candidate users. The online system 140 obtains a content item 405 including content for presentation to users. For example, the content item 405 includes video for presentation to online system users as the online system 140 receives the video data (i.e., live video data). The online system 140 presents the content item to various viewing users 410 who are users satisfying one or more criteria. For example, the viewing users 410 are users who have a connection to a publishing user from whom the online system 140 obtained the content item 405. From the viewing users 410, the online system 140 retrieves embeddings 420 maintained for each of a set of viewing users 410 who performed one or more specific actions with the content item 405. For example, the set of viewing users 410 includes viewing users 410 who viewed at least a threshold amount of video data included in the content item 405.

As further described above in conjunction with FIG. 3, an embedding 420 maintained for a user is based on interactions by the user with content presented to the user by the online system 140. The online system 140 maintains embeddings for its users, allowing the online system 140 to account for prior interactions by the users' with content when identifying content for a user or for another user. For example, an embedding includes different dimensions that each correspond to possible interactions with content presented to a user, with each dimension having a value based on a number of occurrences of an interaction corresponding to a dimension by the user. Hence, an embedding 420 corresponding to a viewing user 410 of the set describes interactions the viewing user performed with content presented to the viewing user 410 by the online system 140.

However, when a limited number of interactions have been performed by users with the content item 405, the online system 140 has limited information for identifying other users likely to have an interest in the content item 405. For example, if the content item 405 includes live video, a limited number of users interact with the content item 405 when the live video is initially presented, limiting an ability of the online system 140 to identify other users to whom the content item 405 may be recommended. To better allow the online system 140 to recommend the content item 405 to other users, the online system 140 generates a content embedding 425 for the content item 405 based on the embeddings 420 maintained for the viewing users 410 of the set, as further described above in conjunction with FIG. 3. When the online system 140 subsequently identifies a candidate user 430, the online system 140 retrieves an embedding 435 corresponding to the candidate user 430 and compares 440 the embedding 435 corresponding to the candidate user 430 to the content embedding 425. As further described above in conjunction with FIG. 3, the online system 140 determines a similarity between the embedding 435 corresponding to the candidate user 430 and the content embedding 425 and communicates a recommendation for the content item 405 to the candidate user 430 if the similarity equals or exceeds a threshold value. This allows the online system 140 to leverage interactions by viewing users 410 with content other than the content item 405 and interactions by the candidate user 430 with other content to determine whether to recommend the content item 405 to the candidate user 430.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
maintaining an embedding corresponding to each user of an online system, the embedding corresponding to a user based on interactions by the user with content presented to the user by the online system;
obtaining a content item at the online system for presentation to users of the online system, the content item including video data;
presenting content from the content item to viewing users of the online system;
identifying a set of the viewing users to whom the content item was presented and who performed one or more specific actions with the content item, the one or more specific actions with the content item comprising viewing at least a threshold amount of the video data included in the content item;
subsequent to identifying the set of viewing users, generating a content embedding associated with the content item based on embeddings corresponding to each of the set of viewing users;
identifying a candidate user of the online system to whom content from the content item has not been presented;
retrieving an embedding corresponding to the candidate user of the online system;
determining a similarity of the embedding corresponding to the candidate user of the online system and the content embedding; and
communicating a recommendation for the content item to a client device associated with the candidate user in response to the similarity equaling or exceeding a threshold.

2. The method of claim 1, wherein the embedding corresponding to the user includes one or more dimensions based on a number of times the user performed an interaction corresponding to a dimension.

3. The method of claim 2, wherein determining the similarity of the embedding corresponding to the candidate user of the online system and the content embedding comprises:
determining a measure of similarity between the embedding corresponding to the candidate user of the online system and the content embedding based on values of one or more dimensions of the embedding corresponding to the candidate user and values of one or more dimensions of the content embedding.

4. The method of claim 2, wherein generating the content embedding associated with the content item based on embeddings corresponding to each of the set of viewing users
determining values associated with one or more dimensions of each embedding corresponding to a viewing user of the set;
determining weights associated with one or more dimensions of each embedding maintained for the viewing users of the set; and
generating the content embedding based on the determined values and the determined weights.

5. The method of claim 1, wherein the video data is presented to one or more users of the online system as the online system receives the video data.

6. The method of claim 1, wherein a specific action with the content item comprises: indicating a reaction to at least a portion of the video data, sharing the video data with another user, commenting on the video data, stopping the video data, closing the video data, navigating away from the video data, identifying a complaint with the video data, or any combination thereof.

7. The method of claim 1, wherein identifying the set of viewing users to whom the content item was presented who performed one or more specific actions with the content item comprises:
identifying a set of users who are currently viewing the video data included in the content item.

8. The method of claim 1, further comprising:
determining a number of users presented with the content item who performed one or more interactions with the content item; and
storing the content embedding in association with the content item in response to the determined number of users equaling or exceeding a threshold number of users.

9. A computer program product comprising a non-transitory computer readable medium having instructions encoded thereon that, when executed by a processor, cause the processor to:
maintain an embedding corresponding to each user of an online system, the embedding corresponding to a user based on interactions by the user with content presented to the user by the online system;
obtain a content item at online system for presentation to users of the online system;
present content from the content item to viewing users of the online system, the content item including video data;
identify a set of the viewing users to whom the content item was presented and who performed one or more specific actions with the content item, the one or more specific actions with the content item comprising viewing at least a threshold amount of the video data included in the content item;
subsequent to identifying the set of viewing users, generate a content embedding associated with the content item based on embeddings corresponding to each of the set of viewing users;
identify a candidate user of the online system to whom content from the content item has not been presented;
retrieve an embedding corresponding to the candidate user of the online system;
determine a similarity of the embedding corresponding to the candidate user of the online system and the content embedding; and
communicate a recommendation for the content item to a client device associated with the candidate user in response to the similarity equaling or exceeding a threshold.

10. The computer program product of claim 9, wherein the embedding corresponding to the user includes one or more dimensions based on a number of times the user performed an interaction corresponding to a dimension.

11. The computer program product of claim 10, wherein determine the similarity of the embedding corresponding to the candidate user of the online system and the content embedding comprises:
determine a measure of similarity between the embedding corresponding to the candidate user of the online system and the content embedding based on values of one or more dimensions of the embedding corresponding to the candidate user and values of one or more dimensions of the content embedding.

12. The computer program product of claim 10, wherein generate the content embedding associated with the content item based on embeddings corresponding to each of the set of viewing users
- determine values associated with one or more dimensions of each embedding corresponding to a viewing user of the set;
- determine weights associated with one or more dimensions of each embedding maintained for the viewing users of the set; and
- generate the content embedding based on the determined values and the determined weights.

13. The computer program product of claim 9, wherein the video data is presented to one or more users of the online system as the online system receives the video data.

14. The computer program product of claim 9, wherein a specific action with the content item comprises: indicating a reaction to at least a portion of the video data, sharing the video data with another user, commenting on the video data, stopping the video data, closing the video data, navigating away from the video data, identifying a complaint with the video data, or any combination thereof.

15. The computer program product of claim 9, wherein identify the set of viewing users to whom the content item was presented who performed one or more specific actions with the content item comprises:
- identify a set of users who are currently viewing the video data included in the content item.

16. The computer program product of claim 9, wherein the computer readable storage medium further has instructions encoded thereon that, when executed by the processor, cause the processor to:
- determine a number of users presented with the content item who performed one or more interactions with the content item; and
- store the content embedding in association with the content item in response to the determined number of users equaling or exceeding a threshold number of users.

* * * * *

UNITED STATES PATENT AND TRADEMARK OFFICE
CERTIFICATE OF CORRECTION

PATENT NO. : 10,715,850 B2
APPLICATION NO. : 15/637617
DATED : July 14, 2020
INVENTOR(S) : Aditya Palnitkar et al.

It is certified that error appears in the above-identified patent and that said Letters Patent is hereby corrected as shown below:

In the Claims

Column 19, Line 52, Claim 4, delete "corresponding to each of the set of viewing users" and insert -- corresponding to each of the set of viewing users comprises: --.

Column 21, Line 4, Claim 12, delete "corresponding to each of the set of viewing users" and insert -- corresponding to each of the set of viewing users comprises: --.

Signed and Sealed this
Seventeenth Day of November, 2020

Andrei Iancu
*Director of the United States Patent and Trademark Office*